United States Patent
Phillips et al.

(10) Patent No.: US 8,296,733 B2
(45) Date of Patent: Oct. 23, 2012

(54) SYSTEMS, DEVICES, AND/OR METHODS FOR MANAGING PROGRAM LOGIC UNITS

(75) Inventors: Scott R. Phillips, Jonesborough, TN (US); Gregory J. Karklins, Johnson City, TN (US)

(73) Assignee: Siemens Aktiengesellschaft, Munich (DE)

( * ) Notice: Subject to any disclaimer, the term of this patent is extended or adjusted under 35 U.S.C. 154(b) by 1083 days.

(21) Appl. No.: 12/205,163

(22) Filed: Sep. 5, 2008

(65) Prior Publication Data

US 2009/0083705 A1 Mar. 26, 2009

Related U.S. Application Data (60) Provisional application No. 60/994,529, filed on Sep. 20, 2007, provisional application No. 60/994,528, filed on Sep. 20, 2007.

(51) Int. Cl.
*G06F 9/44* (2006.01)
(52) U.S. Cl. .......................... 717/122; 717/120; 717/123
(58) Field of Classification Search ........................ None
See application file for complete search history.

(56) References Cited

U.S. PATENT DOCUMENTS

| | | | |
|---|---|---|---|
| 5,056,001 A | 10/1991 | Sexton | |
| 5,438,661 A | 8/1995 | Ogawa | |
| 5,649,200 A * | 7/1997 | Leblang et al. | 717/122 |
| 6,928,637 B2 * | 8/2005 | Leherbauer | 717/122 |
| 7,123,974 B1 * | 10/2006 | Hamilton | 700/87 |
| 7,143,366 B1 | 11/2006 | McKelvey et al. | |
| 7,162,501 B2 * | 1/2007 | Kupkova | 1/1 |
| 7,222,131 B1 * | 5/2007 | Grewal et al. | 717/168 |
| 7,272,815 B1 * | 9/2007 | Eldridge et al. | 717/101 |
| 7,716,649 B2 * | 5/2010 | Clemm et al. | 717/128 |
| 7,904,885 B2 * | 3/2011 | Volkmer | 717/120 |
| 8,037,452 B2 * | 10/2011 | Minium et al. | 717/122 |
| 2003/0163801 A1 * | 8/2003 | Thames et al. | 717/123 |
| 2004/0103124 A1 * | 5/2004 | Kupkova | 707/203 |
| 2004/0168153 A1 * | 8/2004 | Marvin | 717/120 |
| 2005/0091291 A1 * | 4/2005 | Kaler et al. | 707/203 |
| 2005/0149583 A1 * | 7/2005 | Baskaran et al. | 707/203 |
| 2006/0064634 A1 * | 3/2006 | Dettinger et al. | 715/511 |
| 2006/0206866 A1 * | 9/2006 | Eldrige et al. | 717/122 |
| 2007/0006152 A1 * | 1/2007 | Ahmed et al. | 717/122 |
| 2007/0143735 A1 * | 6/2007 | Clemm et al. | 717/100 |
| 2008/0127065 A1 | 5/2008 | Bryant | |
| 2008/0301639 A1 * | 12/2008 | Bell et al. | 717/120 |

(Continued)

FOREIGN PATENT DOCUMENTS

EP 1168165 A2 1/2001

(Continued)

OTHER PUBLICATIONS

M. Bani Younis, "Formalization of existing PLC programs a survey", Proceedings of CESA 2003, Jul. 2003, 6 pages, <http://194.165.157.165/academics/mbaniyounis/uploads/GF_MBY_CESA_jul_2003.pdf>.*

(Continued)

*Primary Examiner* — Thuy Dao
*Assistant Examiner* — Cuong V Luu (57) ABSTRACT

Certain exemplary embodiments can provide a system, which can comprise a block processor. The block processor can be adapted to automatically render a list of automatically described modifications to a first version of a block of a software program adapted to control a programmable logic controller (PLC). The first version can differ from an original version of the block.

17 Claims, 7 Drawing Sheets

U.S. PATENT DOCUMENTS

2009/0037872 A1* 2/2009 Schnabele et al. ............ 717/105

FOREIGN PATENT DOCUMENTS

| EP | 1 403 782 A | 3/2004 |
|---|---|---|
| EP | 1780637 A1 | 5/2007 |
| WO | WO 2006/069763 A | 7/2006 |

OTHER PUBLICATIONS

Marc J. Rochkind, "The Source Code Control System", IEEE 1975, pp. 364-370, <http://www.basepath.com/aup/talks/SCCS-Slideshow.pdf>.*

Tien N. Nguyen, "Flexible Fine-grained Version Control for Software Documents", IEEE 2004, 8 pages, <http://ieeexplore.ieee.org/stamp/stamp.jsp?tp=&arnumber=1371922>.*

Hideki Koike, "VRCS: Integrating Version Control and Module Management using Interactive Three-Dimensional Graphics", IEEE 1997, pp. 168-173, <http://ieeexplore.ieee.org/stamp/stamp.jsp?tp=&arnumber=626577>.*

Walter F, Tichy, "Design, Implementation, and Evaluation of a Revision Control System", IEEE 1982, pp. 58-67, <http://dl.acm.org/citation.cfm?id=807748>.*

Y. Chen, "Using Automatic Clustering to Produce High-Level System Organizations of Source Code", IEEE 1998, 8 pages, <http://ieeexplore.ieee.org/stamp/stamp.jsp?tp=&arnumber=693283>.*

PCT International Search Report dated Dec. 30, 2009 for related foreign application.

PCT International Search Report with Written Opinion dated Apr. 4, 2009 for related foreign application.

* cited by examiner

SYSTEMS, DEVICES, AND/OR METHODS FOR MANAGING PROGRAM LOGIC UNITS

CROSS-REFERENCE TO RELATED APPLICATIONS

This application claims priority to, and incorporates by reference herein in its entirety, pending U.S. Provisional Patent Application Ser. No. 60/994,529, filed 20 Sep. 2007; and pending U.S. Provisional Patent Application Ser. No. 60/994,528, filed 20 Sep. 2007.

BACKGROUND

United States Patent Publication 20080127065 (Bryant), which is incorporated by reference herein in its entirety, discloses that "[c]ertain exemplary embodiments comprise a system. The system can comprise a user interface renderer, which can be adapted to render a plurality of distinct user interfaces. Each user interface from the plurality of distinct user interfaces can be adapted to configure a corresponding software application from a plurality of software applications associated with operating a programmable logic controller (PLC)." See Abstract.

U.S. Pat. No. 5,056,001 (Sexton), which is incorporated by reference herein in its entirety, discloses that a "method is provided for configuring a smart module which is coupled to a programmable logic controller. The controller includes an initial configuration file which specifies an initial configuration for the smart module. After power up and initialization of the controller, the initial configuration file is transmitted from the controller to the smart module. The initial configuration file is now designated a current configuration file and the smart module assumes the configuration specified by the current configuration file. In accordance with the method of the invention, module specific information which is stored in the module is then displayed to aid a user in configuring the module. The user can then modify the current configuration file in response to the module specific information which was displayed. This method significantly simplifies the process of configuring smart modules for the user." See Abstract.

SUMMARY

Certain exemplary embodiments can provide a system, which can comprise a block processor. The block processor can be adapted to automatically render a list of automatically described modifications to a first version of a block of a software program adapted to control a programmable logic controller (PLC). The first version can differ from an original version of the block.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which can comprise a block processor. The block processor can be adapted to automatically render a list of automatically described modifications to a first version of a block of a software program adapted to control a programmable logic controller (PLC). The first version can differ from an original version of the block.

Programmable logic controllers (PLCs) can be programmed using program logic units (PLUs) also known as blocks or networks. These blocks can be created and/or configured by an original equipment manufacturer (OEM) and/or an end user. During a lifetime of a block, many modifications can be made during development and/or maintenance. It is often beneficial for the user to be able to perform a comparison of an individual block with a previous version or online version of the same block. This comparison can be performed by comparing the contents of the current block version against the original block version. The output of such a comparison can comprise conjectural statements about the conflicts that might exist between the two block instances. In the absence of the actual actions that led to the modifications, exemplary comparison algorithms can make assumptions about how and what has changed. Therefore, there can be a benefit from producing a list of actual change events regarding a block. Such transactional data can be used to precisely describe the change set that exists between the two versions of the same block.

Certain exemplary embodiments can automatically compile a list of historical transactions on the block level. Each entry can, using standardized nomenclature, contain enough information to automatically identify, find, and/or describe the modification. The list of historical transactions can be automatically saved along with the block. In the case of an offline block, the transactions can be automatically stored as part of the offline project. During an automatic comparison, the transaction lists from both block versions can be automatically inspected. The last entry that is common for both lists can be automatically identified. All other entries located after the last common entry can be automatically gathered and/or processed as the list of changes between the two block versions. It can be possible to automatically describe the type and/or location of the change accurately and precisely.

Figure 1:
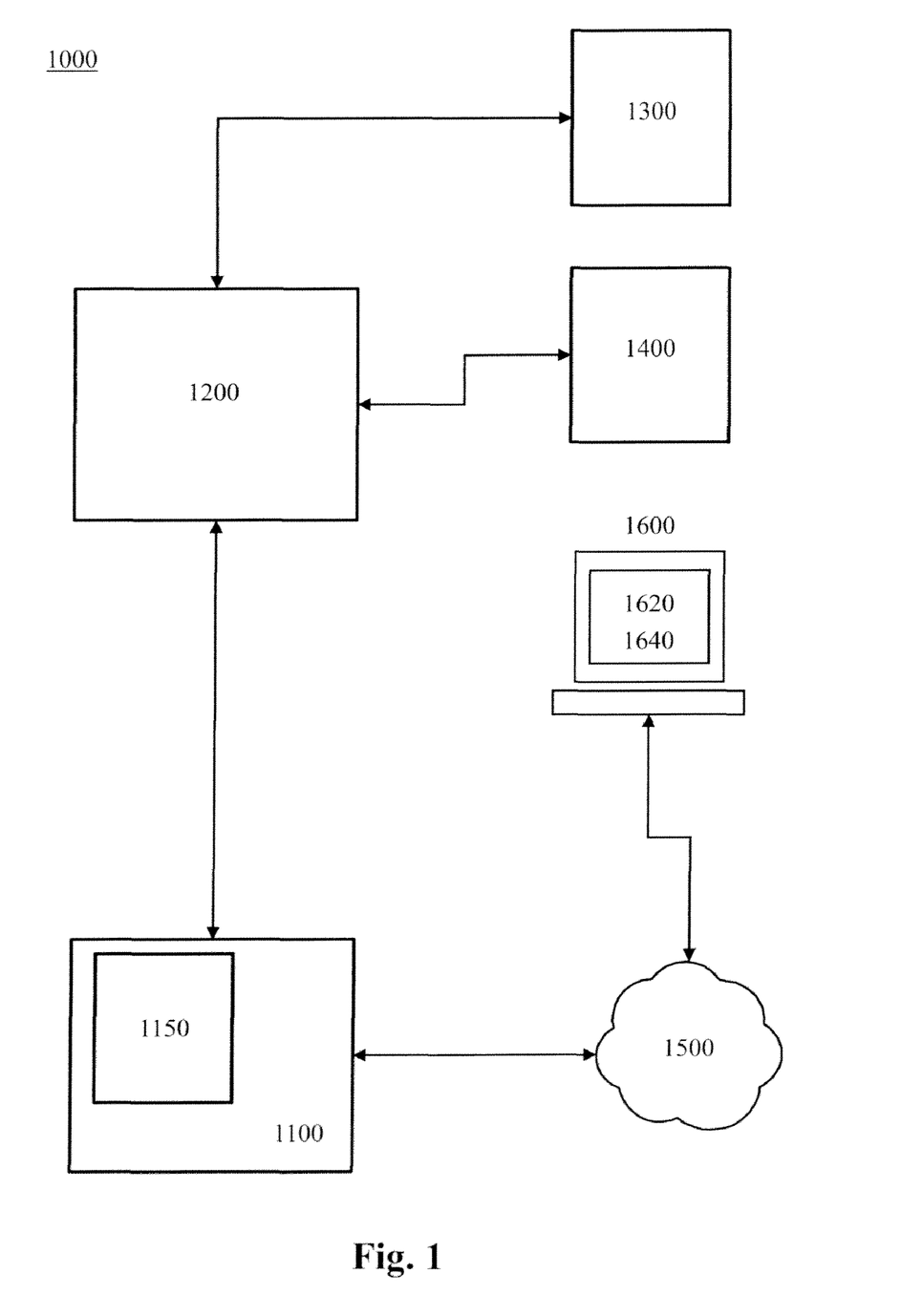
FIG. 1 is a block diagram of an exemplary embodiment of a system 1000.

FIG. 1 is a block diagram of an exemplary embodiment of a system 1000, which can comprise a programmable logic controller 1100. In certain exemplary embodiments, programmable logic controller 1100 can comprise a block processor 1150. Block processor 1150 can be adapted to create, modify, and/or log modifications to blocks of a control program of programmable logic controller 1100. Programmable logic controller 1100 can comprise and/or be communicatively coupled to an Input/Output module 1200. Input/Output module 1200 can be communicatively coupled to any desired number of sensors, such as sensor 1300. Input/Output module 1200 can be communicatively coupled to any desired number of actuators, such as actuator 1400. Via the control program, programmable logic controller 1100 can be adapted to receive information from sensor 1300 and/or control actuator 1400 in hard real time.

Block processor 1150 can be adapted to:
- automatically render a list of automatically described modifications to a first version of a predetermined block of a software program adapted to control a programmable logic controller (PLC), the first version differing from an original version of the predetermined block;
- provide a user interface for a user to specify at least one modification to the first version of the predetermined block;
- receive at least one user-specified modification to the first version of the predetermined block;
- automatically generate a description of a user-specified modification to the first version of the predetermined block;
- automatically log a type of a user-specified modification to the first version of the predetermined block;
- automatically log a location of a user-specified modification to the first version of the predetermined block;
- automatically log parameters of a user-specified modification to the first version of the predetermined block;
- store a description of a user-specified modification to the first version of the predetermined block;
- obtain an automatically generated description of a first version of the predetermined block;
- obtain an automatically generated description of a second version of the predetermined block, the second version differing from the first distinct version by at least one user-specified modification;
- automatically compare an automatically generated description of the first version of the predetermined block to an automatically generated description of a second version of the predetermined block, the second version differing from the first version by at least one user-specified modification, the first version differing from an original version of the predetermined block;
- automatically identify at least one difference between an automatically generated description of the first version of the predetermined block and an automatically generated description of a second version of the predetermined block, the second version differing from the first version by at least one user-specified modification;
- automatically render an automatically generated description of a first distinct version of the predetermined block an automatically generated description of a second distinct version of the predetermined block, the second distinct version differing from the first distinct version by at least one user-specified modification, the first distinct version differing from an original version of the predetermined block;
- automatically render a list of differences between an automatically generated description of a first distinct version of the predetermined block and an automatically generated description of a second distinct version of the predetermined block, the first distinct version differing from an original version of the predetermined block; and/or
- automatically render a list of automatically generated descriptions of all modifications to a second distinct version of the predetermined block with respect to a first distinct version of the predetermined block, the first distinct version differing from an original version of the predetermined block.

Programmable logic controller 1100 can be communicatively coupled to an information device 1600 via a network 1500. Information device 1600 can comprise and/or be communicatively coupled to a user interface 1620 and a user program 1640. User program 1540 can be adapted to monitor and/or control one or more activities associated with programmable logic controller 1100 such as modifications to one or more blocks of the control program. User interface 1620 can be adapted to render information regarding programmable logic controller 1100 such as information regarding modifications to blocks of the control program.

Figure 2:
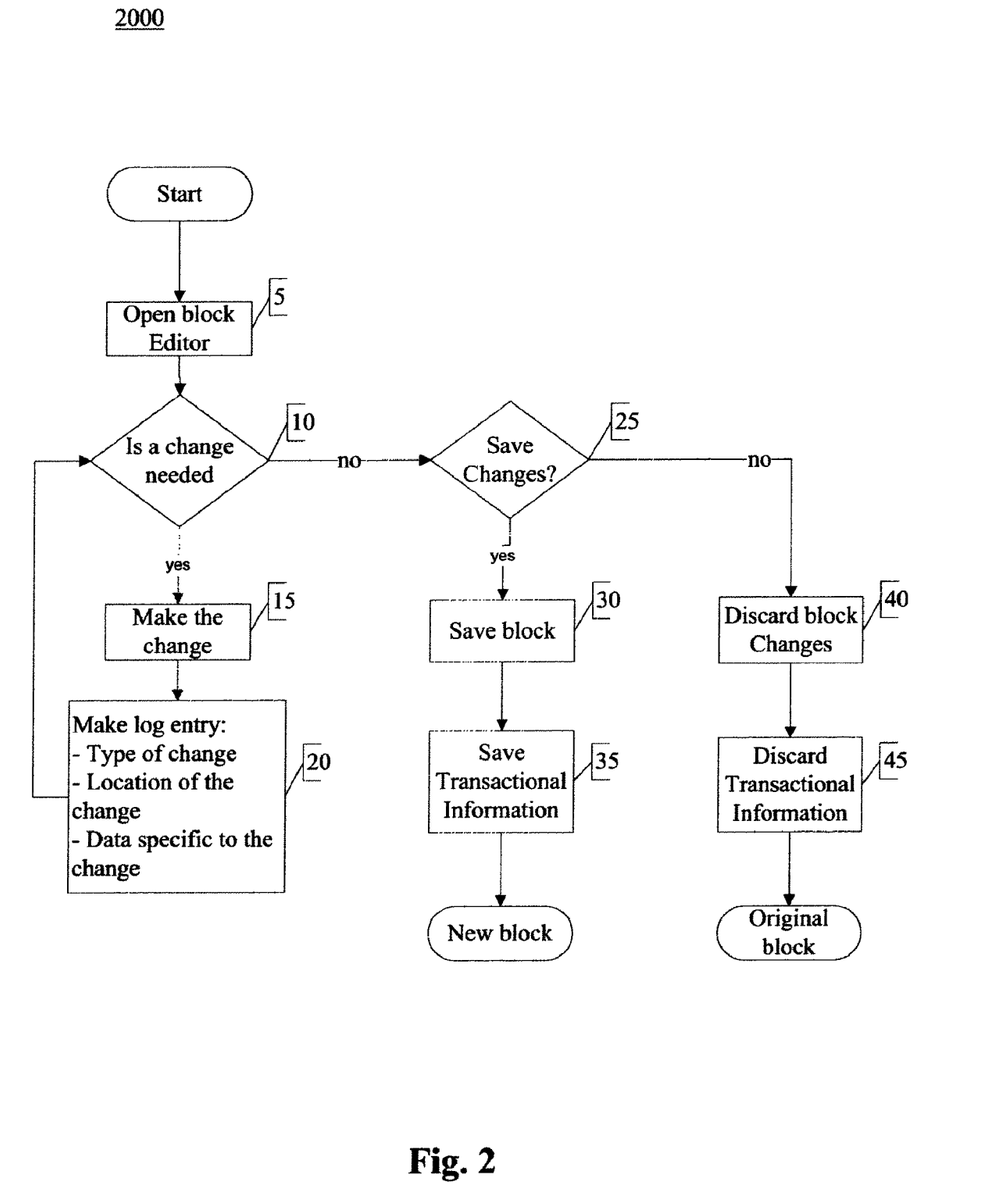
FIG. 2 is a flowchart of an exemplary embodiment of a method 2000.

FIG. 2 is a flowchart of an exemplary embodiment of a method 2000, which can be referred to as an offline block. The user can open a block editor (5) and/or modify a block (10). After a modification is made (15), transactional information describing the modification can be automatically logged (20). This information can contain enough information to identify, find, and/or describe the modification. When the user finishes making the modification, the user then can decide to save or discard the changes (25). If the user wishes to save the changes, the block can be saved (30) along with all of the transactional data (35). Since this is an offline block change, the data can be automatically stored with the PLU within the project. If the user decided to not save the modifications, the block modifications (40) can be discarded along with the transactional data (45).

Figure 3:
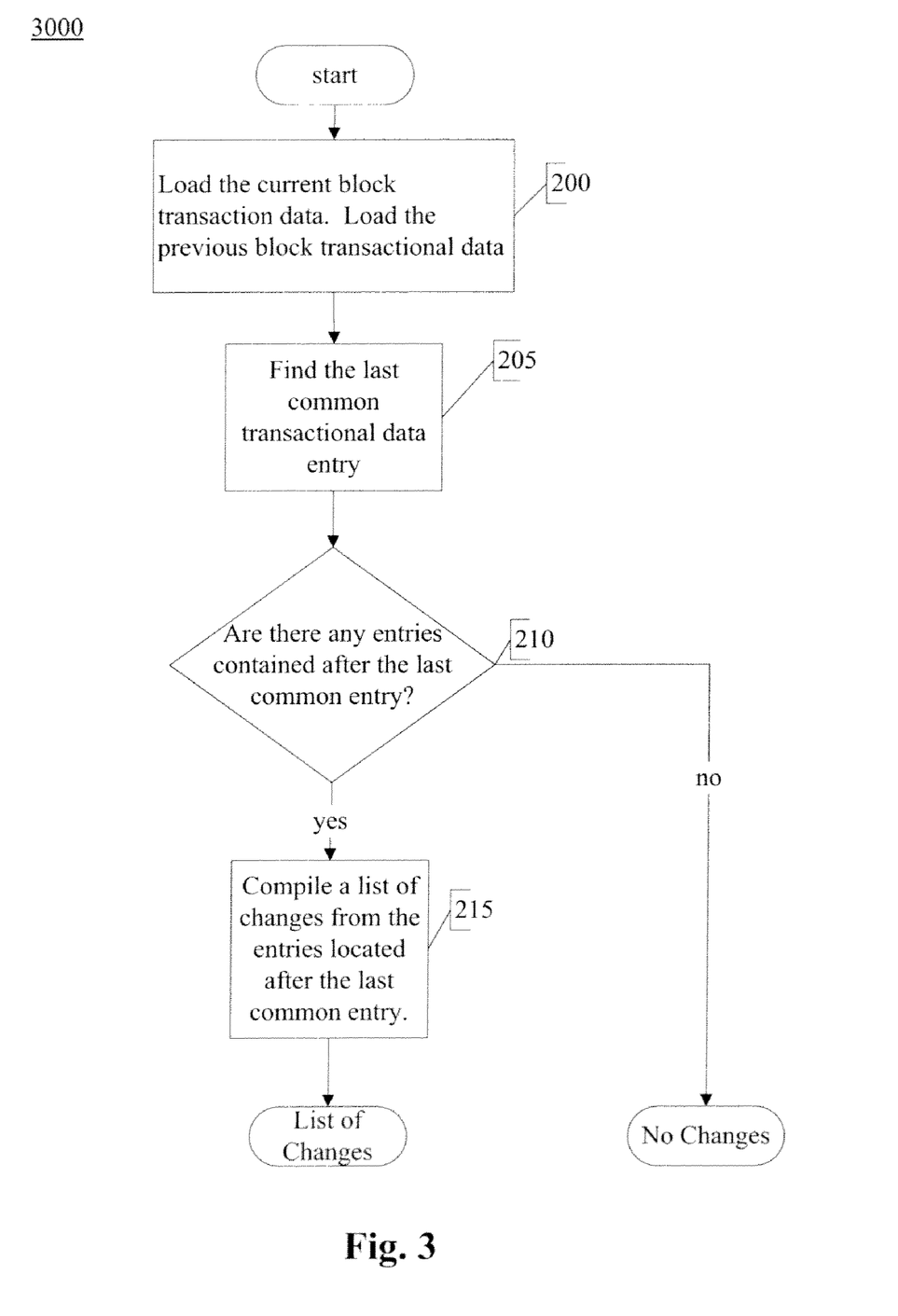
FIG. 3 is a flowchart of an exemplary embodiment of a method 3000.

FIG. 3 is a flowchart of an exemplary embodiment of a method 30 which shows how exemplary transactional data can be automatically processed in order to produce a comparison. The user can identify block versions to compare. The transactional data for both block versions (200) can be automatically loaded. The transaction data then can be automatically compared and the last common entry then can be automatically identified (205). If neither list of transaction data contains additional entries after the last common entry, then the two block versions contain no changes and can be marked as equal (210). If additional entries do exist, then the additional entries can be used to automatically generate an accurate list of changes (215).

Figure 4:
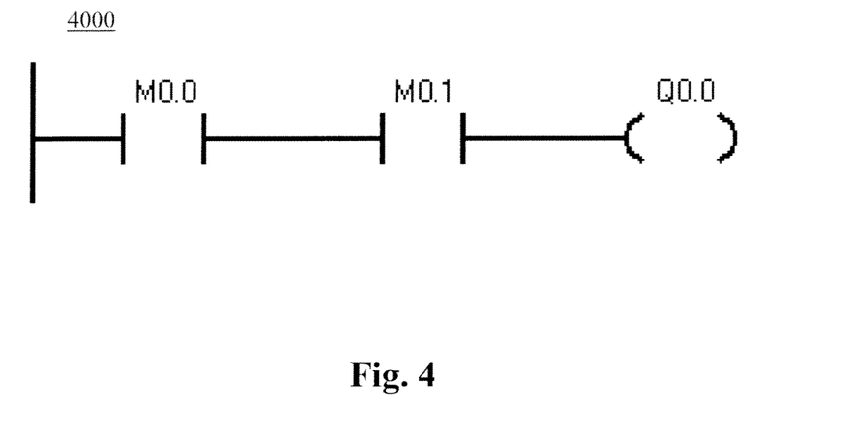
FIG. 4 is an exemplary embodiment of a ladder logic network 4000.

FIG. 4 is an exemplary embodiment of a ladder logic network 4000, which is an example of a simplistic exemplary case where the user is making a modification to an offline block. The original network is shown in network 4000. The network comprises two contacts and a coil.

Figure 5:
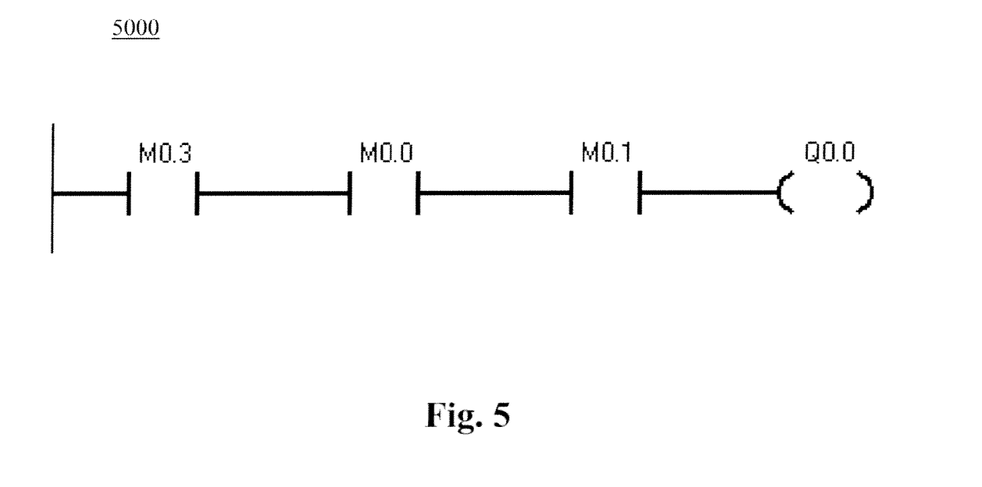
FIG. 5 is an exemplary embodiment of a ladder logic network 5000.

FIG. 5 is an exemplary embodiment of a ladder logic network 5000, in which the user inserts a new contact, M0.3, at the beginning of the network illustrated as network 4000 in FIG. 4. At this point a new transactional log entry can be automatically added describing the insertion of the contact.

Figure 6:
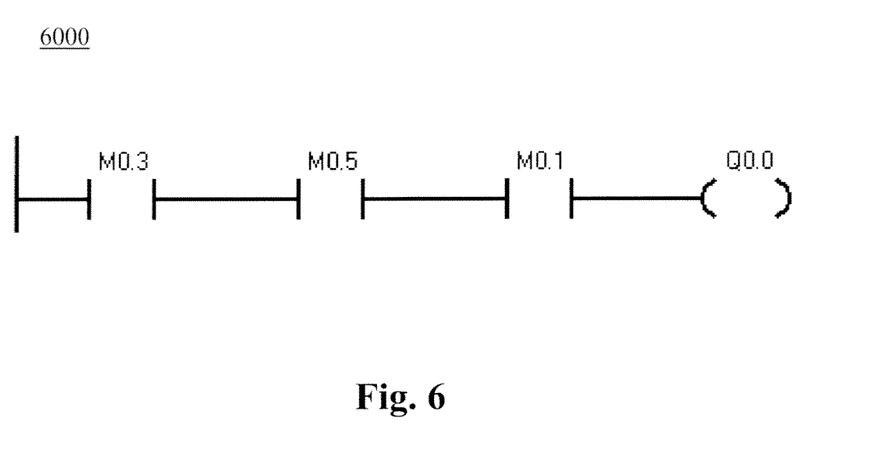
FIG. 6 is an exemplary embodiment of a ladder logic network 6000.

FIG. 6 is an exemplary embodiment of a ladder logic network 6000, in which the user modifies the contact M0.0 to have the value of M0.5 as compared to network 5000 of FIG. 5. Again a new transactional log entry can be automatically created with the information describing the edit.

Figure 7:
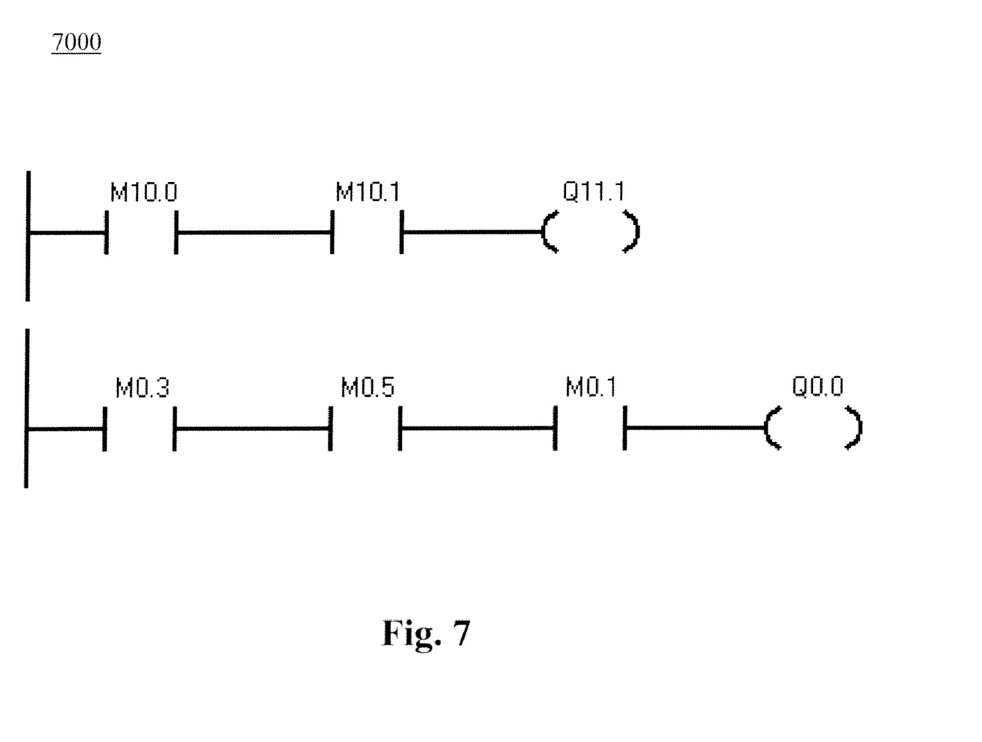
FIG. 7 is an exemplary embodiment of a ladder logic network 7000.

FIG. 7 is an exemplary embodiment of a ladder logic network 7000, in which the user adds a new network above the network as compared to network 6000 of FIG. 6. The creating of the new network would automatically add several log entries consisting of the insertion of the network and then entries describing the individual contact and coil insertions.

In certain exemplary embodiments, comparison techniques, which only examine end results, compare the original block version against the newly modified block version. First, the comparison can compare the original network from the original block against the newly inserted network of the modified block. This is because the comparison might not know that the network within the modified block is a newly inserted network. Then, the modified original network which is unmatched would be marked as inserted. The output might look something like the following:

Comparing Original Block (Network 1) against Modified Block (Network 1)
The M0.1 contact address has changed to M10.0.
The M0.1 contact address has changed to M10.1.
The Q0.0 coil address has changed to Q11.1.
Modified Block (Network 2) was inserted.

Notice that the comparison output can be very misleading. First it compares the original network to the newly inserted network. It then marks the modified original network as being newly inserted. In addition if the original block contained multiple networks, the originally modified network would be compared against a completely unrelated network propagating the erroneous comparison.

Via certain exemplary embodiments, the comparison can first automatically query for a list of changes that have occurred since the last common log entry of the two block versions. This list can look like the following:

Insert; 0; Contact; M0.3; network AZ (where AZ uniquely identifies the original network);
Edit; Contact; M0.0; M0.5; network AZ;
Insert; Network; Head; network BZ (where BZ uniquely identifies the new network);
Insert;0; Contact; M10.0; network BZ;
Insert;1; Contact; M10.1; network BZ; and/or
Insert; 2; Coil; Q1.1; network BZ.

This information can be automatically processed to produce a highly accurate description of the changes. A typical textual summary of the comparison might look like the following:

Comparing Original Block (Network 1) against Modified Block (Network 2);
the M0.3 Contact was inserted at the beginning of the network;
the M0.0 Contact address has changed to M0.5; and/or
Modified Block (Network 1) has been inserted.

First, the correct networks actually can be automatically compared. Network 1 from the original block version can be automatically compared against what is now network 2 from the modified block. In addition, Network 1 can be correctly and/or automatically marked as inserted. Notice that the additional insertion information for the new network need not be reported since the entire network was marked as inserted.

Certain exemplary embodiments can comprise a signal comprising machine instructions for activities, which can comprise automatically rendering a list of automatically described modifications to a first version of a predetermined block of a software program adapted to control a programmable logic controller (PLC), the first version differing from an original version of the predetermined block.

Figure 8:
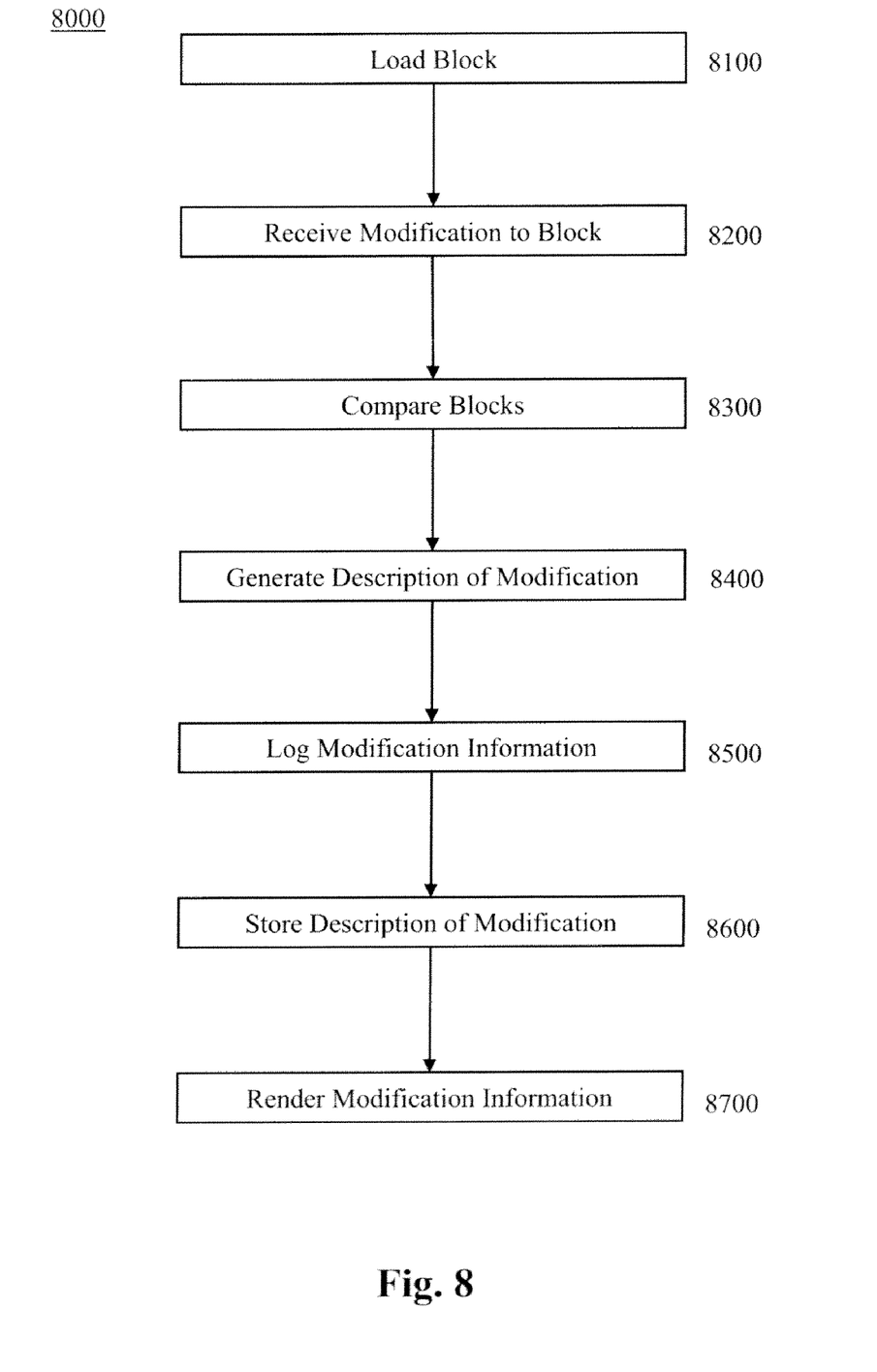
FIG. 8 is a flowchart of an exemplary embodiment of a method 8000.

FIG. 8 is a flowchart of an exemplary embodiment of a method 8000. Any activity or subset of activities of method 8000 can be implemented automatically, such as via machine-implementable instructions stored on a machine-readable medium. At activity 8100, a block, such as a predetermined block, of a control program of a programmable logic controller can be loaded into a memory. Certain exemplary embodiments can provide a user interface for a user to specify at least one modification to the first version of the predetermined block. Certain exemplary embodiments can obtain an automatically generated description of a first version of the predetermined block.

At activity 8200, a modification to the block can be received. Certain exemplary embodiments can receive at least one user-specified modification to the first version of the predetermined block.

At activity 8300, the block can be compared to a prior version of the block. Certain exemplary embodiments can obtain an automatically generated description of a second version of the predetermined block, the second version differing from the first distinct version by at least one user-specified modification. Certain exemplary embodiments can automatically compare an automatically generated description of the first version of the predetermined block to an automatically generated description of a second version of the predetermined block, the second version differing from the first version by at least one user-specified modification, the first version differing from an original version of the predetermined block. Certain exemplary embodiments can automatically identify at least one difference between an automatically generated description of the first version of the predetermined block and an automatically generated description of a second version of the predetermined block, the second version differing from the first version by at least one user-specified modification.

At activity 8400, a description of modifications to the block can be generated. Certain exemplary embodiments can be adapted to automatically generate a description of a user-specified modification to the first version of the predetermined block.

At activity 8500, modification information regarding the block can be logged. Certain exemplary embodiments can be adapted to automatically log a type of a user-specified modification to the first version of the predetermined block. Certain exemplary embodiments can be adapted to automatically log. parameters of a user-specified modification to the first version of the predetermined block. Certain exemplary embodiments can be adapted to store a description of a user-specified modification to the first version of the predetermined block At activity 8600, a description of the modification can be stored. Certain exemplary embodiments can be adapted to automatically log a location of a user-specified modification to the first version of the predetermined block.

At activity 8700, the modification information can be rendered. Certain exemplary embodiments can be adapted to automatically render a list of automatically described modifications to a first version of a predetermined block of a software program adapted to control a programmable logic controller (PLC), the first version differing from an original version of the predetermined block. Certain exemplary embodiments can automatically render an automatically generated description of a first distinct version of the predetermined block an automatically generated description of a second distinct version of the predetermined block, the second distinct version differing from the first distinct version by at least one user-specified modification. The first distinct version can differ from an original version of the predetermined block. Certain exemplary embodiments can automatically render a list of differences between an automatically generated description of a first distinct version of the predetermined block and an automatically generated description of a second distinct version of the predetermined block. The first distinct version can differ from an original version of the predetermined block. Certain exemplary embodiments can automatically render a list of automatically generated descriptions of all modifications to a second distinct version of the predetermined block with respect to a first distinct version of the predetermined block.

Figure 9:
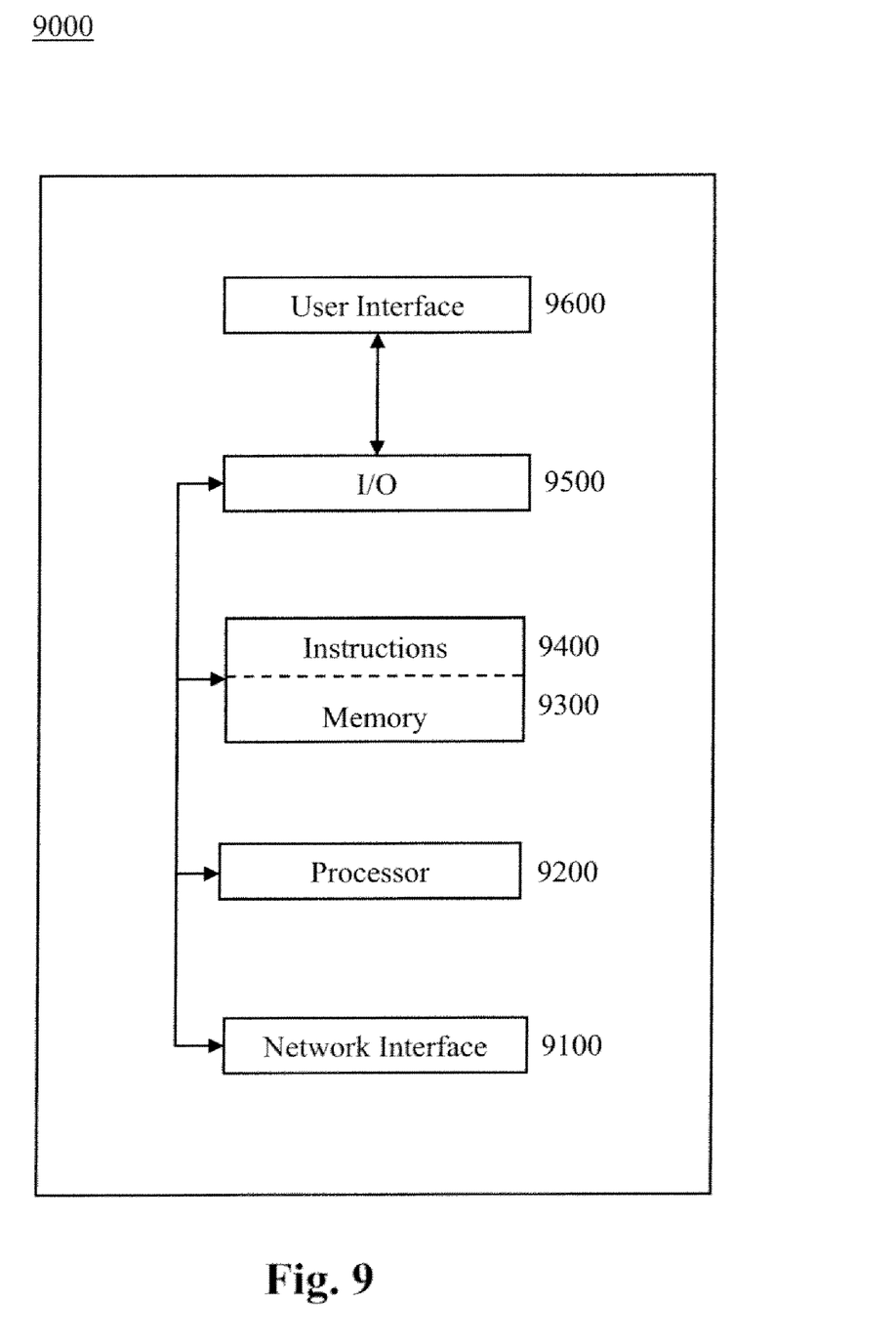
FIG. 9 is a block diagram of an exemplary embodiment of an information device 9000.

FIG. 9 is a block diagram of an exemplary embodiment of an information device 9000, which in certain operative embodiments can comprise, for example, information device 1600 of FIG. 1. Information device 9000 can comprise any of numerous circuits and/or components, such as for example, one or more network interfaces 9100, one or more processors 9200, one or more memories 9300 containing instructions 9400, one or more input/output (I/O) devices 9500, and/or one or more user interfaces 9600 coupled to I/O device 9500, etc.

In certain exemplary embodiments, via one or more user interfaces 9600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, deed, function, step, and/or process and/or a portion thereof.
adapted to—suitable, fit, and/or capable of performing a specified function.
all—each and every significant and/or relevant thing.
associate—to relate, bring together in a relationship, snap, combine, join, and/or connect.
at least—not less than.
automatically—acting and/or operating in a manner essentially independent of external human influence and/or control. For example, an automatic light switch can turn on upon "seeing" a person in its view, without the person manually operating the light switch.
between—in a separating interval and/or intermediate to.
block—a set of machine-implementable instructions adapted for use by a programmable logic controller.
block processor—a processor adapted to manage, manipulate, analyze, and/or render a block.
can—is capable of, in at least some embodiments.
cause—to bring about, provoke, precipitate, produce, elicit, be the reason for, result in, and/or effect.
circuit—an electrically conductive pathway and/or a communications connection established across two or more switching devices comprised by a network and between corresponding end systems connected to, but not comprised by the network.
compare—to examine in order to note similarities and/or differences in relation to something else.
comprising—including but not limited to, what follows.
configure—to design, arrange, set up, shape, and/or make suitable and/or fit for a specific purpose.
control—(n) a mechanical or electronic device used to operate a machine within predetermined limits; (v) to exercise authoritative and/or dominating influence over, cause to act in a predetermined manner, direct, adjust to a requirement, and/or regulate.
convert—to transform, adapt, and/or change, such as from a first form to a second form.
create—to make, form, produce, generate, bring into being, and/or cause to exist.
data—information represented in a form suitable for processing by an information device.
define—to establish the meaning, relationship, outline, form, and/or structure of; and/or to precisely and/or distinctly describe and/or specify.
describe—to represent.
description—a representation of one or more characteristics.
determine—to obtain, calculate, decide, deduce, establish, and/or ascertain.
device—a machine, manufacture, and/or collection thereof.
differ—to change, to be distinct, and/or to be separate.
difference—a determinable variation.
different—changed, distinct, and/or separate.
distinct—discrete and/or readily distinguishable from all others.
estimate—a calculated value approximating an actual value.
first—an initial element of a set.
from—used to indicate a source.
further—in addition.
generate—to create, produce, render, give rise to, and/or bring into existence.
haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.
hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers identify—to specify, recognize, detect, and/or establish the identity, origin, nature, and/or definitive characteristics of.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

Input/Output (I/O) device—an input/output (I/O) device of an information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

initialize—to create, produce, render, give rise to, and/or bring into existence.

input—a signal, data, and/or information provided to a processor, device, and/or system.

install—to connect and/or place in position and prepare for use.

interface—(n) a boundary across which two independent systems meet and act on and/or communicate with each other. (v.) to connect with and/or interact with by way of an interface.

list—a sequence of information.

location—a place.

log—(n.) a record of events; (v.) to record details of an event.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

modification—a change to a content of an electronic file.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

obtain—to receive, get, take possession of, procure, acquire, calculate, determine, and/or compute.

original—preceding all others in time or being as first made and/or used.

output—(n) something produced and/or generated; data produced by an information device executing machine-readable instructions; and/or the energy, power, work, signal, and or information produced by a system. (v) to provide, produce, manufacture, and/or generate.

packet—a generic term for a bundle of data organized in a specific way for transmission, such as within and/or across a network, such as a digital packet-switching network, and comprising the data to be transmitted and certain control information, such as a destination address.

parameter—a measurable and/or quantifiable characteristic of a block.

plurality—the state of being plural and/or more than one.

predetermined—determine, decide, or establish in advance.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/ or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

program—a plurality of machine-implementable instructions.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, ignitors, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in ILC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

provide—to furnish, supply, give, convey, send, and/or make available.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/ or have bestowed upon.

render—to display, annunciate, speak, print, and/or otherwise make perceptible to a human, for example as data, commands, text, graphics, audio, video, animation, and/ or hyperlinks, etc., such as via any visual, audio, and/or haptic mechanism, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

said—when used in a system or device claim, an article indicating a subsequent claim term that has been previously introduced.

second—an element that is distinct from a first element of a set.

select—to make and/or indicate a choice and/or selection from among alternatives.

set—a related plurality of predetermined elements; and/or one or more distinct items and/or entities having a specific common property or properties.

signal—information encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

soft deadline—the general case where completing the activity by the deadline results in the system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with the anti-lock braking system where a slow down in response would likely cause system failure, possibly even catastrophic failure.

software—instructions executable on a machine and/or processor to create a specific physical configuration of digital gates and machine subsystems for processing signals.

specify—to describe, characterize, indicate, and/or state explicitly and/or in detail.

store—to place, hold, retain, enter, and/or copy into and/or onto a machine-readable medium.

substantially—to a considerable, large, and/or great, but not necessarily whole and/or entire, extent and/or degree.

system—a collection of mechanisms, devices, machines, articles of manufacture, processes, data, and/or instructions, the collection designed to perform one or more specific functions.

transmit—to provide, furnish, supply, send as a signal, and/or to convey (e.g., force, energy, and/or information) from one place and/or thing to another.

type—a number of things having in common traits or characteristics that distinguish them as a group or class.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing icon, window, title bar, panel, sheet, tab, drawer, matrix, table, form, calendar, outline view, frame, dialog box, static text, text box, list, pick list, pop-up list, pull-down list, menu, tool bar, dock check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

user-specified—stated, provided, and/or determined by a user.

version—an identified body of software that varies as compared to another body of software of a same class.

via—by way of and/or utilizing.

wherein—in regard to which; and; and/or in addition to.

with respect—as compared.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method comprising:
automatically logging transactional information describing each modification to a first version of a predetermined block of a software program adapted to control a programmable logic controller (PLC), said first version differing from an original version of said predetermined block; automatically identifying a last transactional entry that is common for both the first version and the original version of the predetermined block, automatically generating a description of a user-specified modification to said first version of said predetermined block, and automatically rendering a list of the automatically logged transaction information describing each modification occurring after the last common entry.

2. The method of claim 1, further comprising:
providing a user interface for a user to specify at least one modification to said first version of said predetermined block.

3. The method of claim 1, wherein:
receiving at least one user-specified modification to said first version of said predetermined block.

4. A non-transitory machine-readable medium comprising machine-implementable instructions for activities comprising: automatically logging transactional information describing each modification to a first version of a predetermined block of a software program adapted to control a programmable logic controller (PLC), said first version differing from an original version of said predetermined block, automatically generating a description of a user-specified modification to said first version of said predetermined block, automatically identifying a last transactional entry that is common for both the first version and the original version of the predetermined block; and automatically rendering a list of the automatically logged transactional information describing each modification occurring after the last common entry.

5. A system having a processor comprising: a block processor adapted to automatically log transactional information describing each modification to a first version of a predetermined block of a software program adapted to control a programmable logic controller (PLC), said first version differing from an original version of said predetermined block, the block processor also adapted to automatically identify a last transactional entry that is common for both the first version and the original version of the predetermined block, automatically generate a description of a user-specified modification to said first version of said predetermined block, and automatically render a list of the automatically logged transactional information describing each modification occurring after the last common entry.

6. The system of claim 5, wherein said block processor is adapted to:
provide a user interface for a user to specify at least one modification to said first version of said predetermined block.

7. The system of claim 5, wherein said block processor is adapted to:
receive at least one user-specified modification to said first version of said predetermined block.

8. The system of claim 5, wherein said block processor is adapted to:
automatically log a type of a user-specified modification to said first version of said predetermined block.

9. The system of claim 5, wherein said block processor is adapted to:
automatically log a location of a user-specified modification to said first version of said predetermined block.

10. The system of claim 5, wherein said block processor is adapted to:
automatically log parameters of a user-specified modification to said first version of said predetermined block.

11. The system of claim 5, wherein said block processor is adapted to:
store a description of a user-specified modification to said first version of said predetermined block.

12. The system of claim 5, wherein said block processor is adapted to:
obtain an automatically generated description of said first version of said predetermined block; and
obtain an automatically generated description of a second version of said predetermined block, said second version differing from said first version by at least one user-specified modification.

13. The system of claim 5, wherein said block processor is adapted to:
automatically compare an automatically generated description of said first version of said predetermined block to an automatically generated description of a second version of said predetermined block, said second version differing from said first version by at least one user-specified modification, said first version differing from an original version of said predetermined block.

14. The system of claim 5, wherein said block processor is adapted to:
automatically identify at least one difference between an automatically generated description of said first version of said predetermined block and an automatically generated description of a second version of said predetermined block, said second version differing from said first version by at least one user-specified modification.

15. The system of claim 5, wherein said block processor is adapted to:

automatically render an automatically generated description of a first distinct version of said predetermined block an automatically generated description of a second distinct version of said predetermined block, said second distinct version differing from said first distinct version by at least one user-specified modification, said first distinct version differing from an original version of said predetermined block.

16. The system of claim 5, wherein said block processor is adapted to:
automatically render a list of differences between an automatically generated description of a first distinct version of said predetermined block and an automatically generated description of a second distinct version of said predetermined block, said first distinct version differing from an original version of said predetermined block.

17. The system of claim 5, wherein said block processor is adapted to:
automatically render a list of automatically generated descriptions of all modifications to a second distinct version of said predetermined block with respect to a first distinct version of said predetermined block, said first distinct version differing from an original version of said predetermined block.

* * * * *